Feb. 3, 1959 G. W. MARTIN 2,872,248
PNEUMATIC CONVEYOR FOR PLANTING IMPLEMENT
Filed June 25, 1953 3 Sheets-Sheet 1
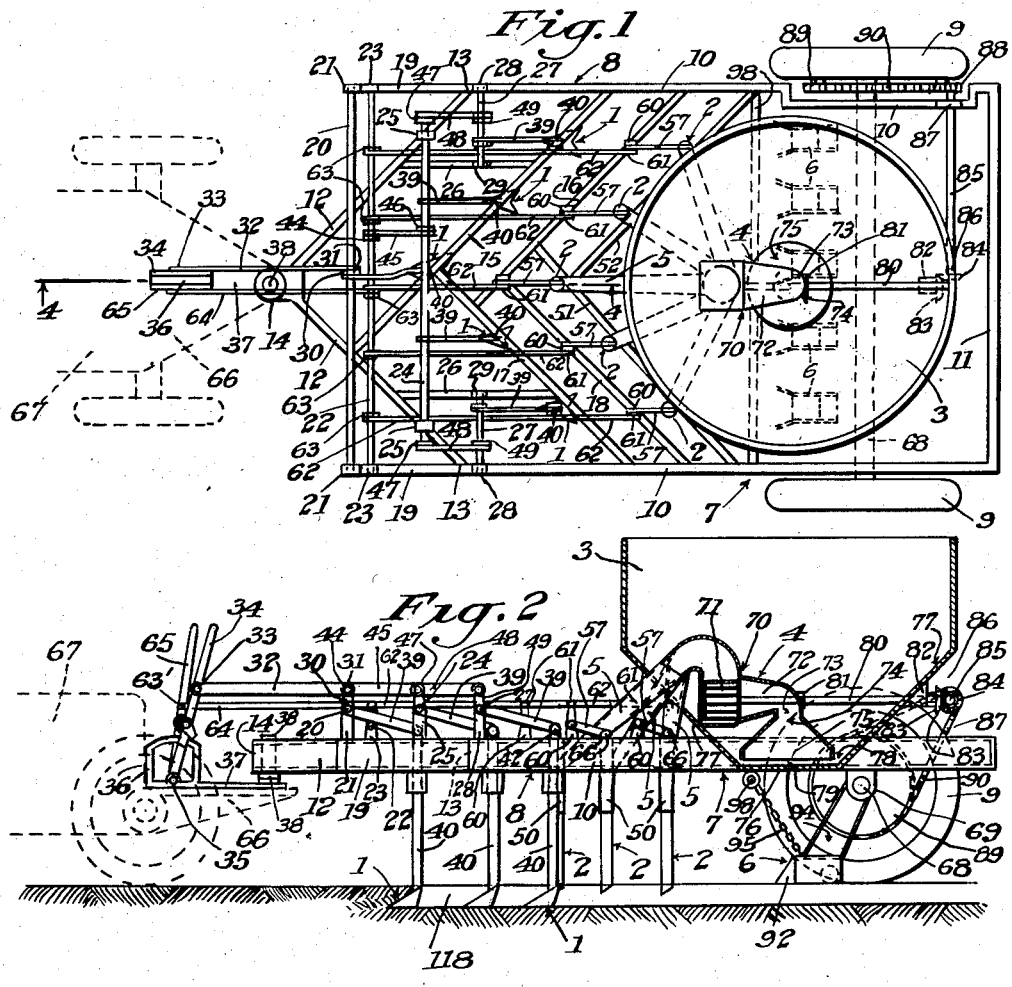
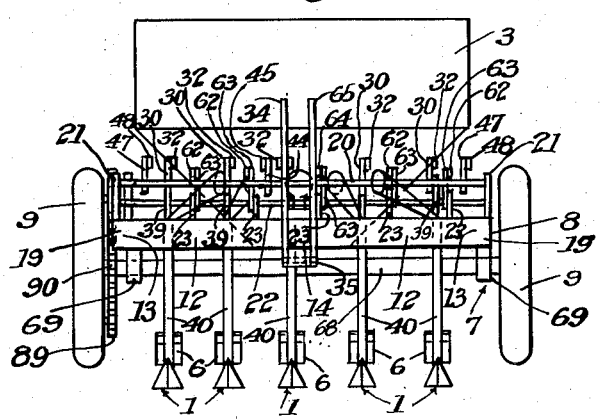
INVENTOR:
BY Georgia W. Martin
Alan Franklin
ATTORNEY.

Feb. 3, 1959 G. W. MARTIN 2,872,248
PNEUMATIC CONVEYOR FOR PLANTING IMPLEMENT
Filed June 25, 1953 3 Sheets-Sheet 2
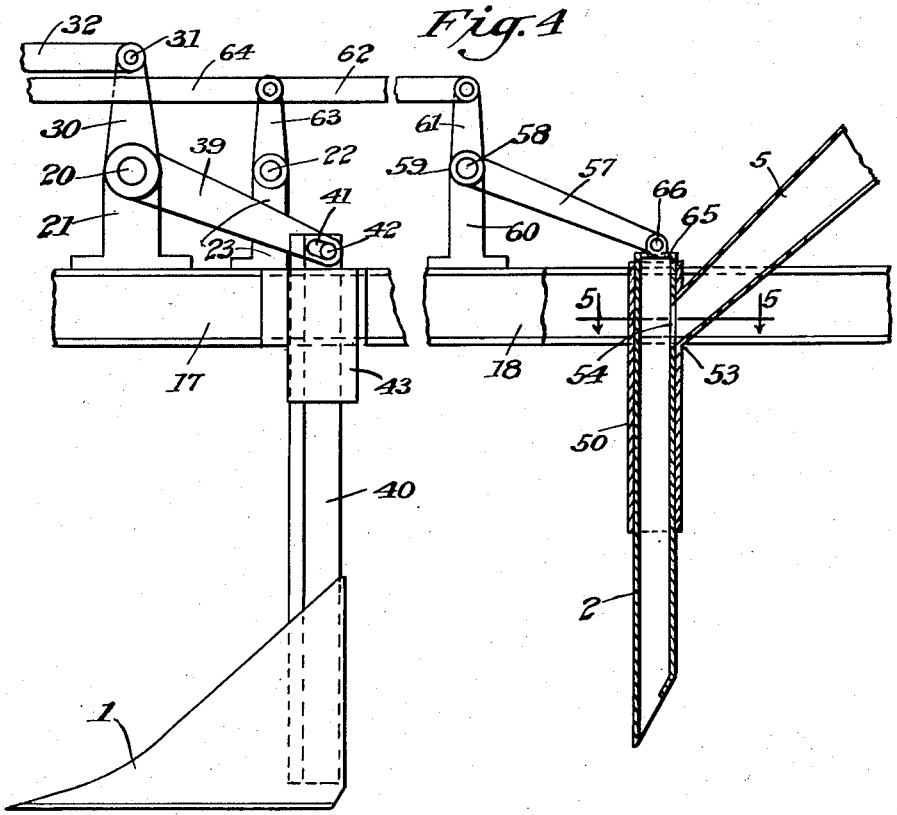
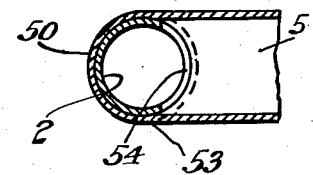
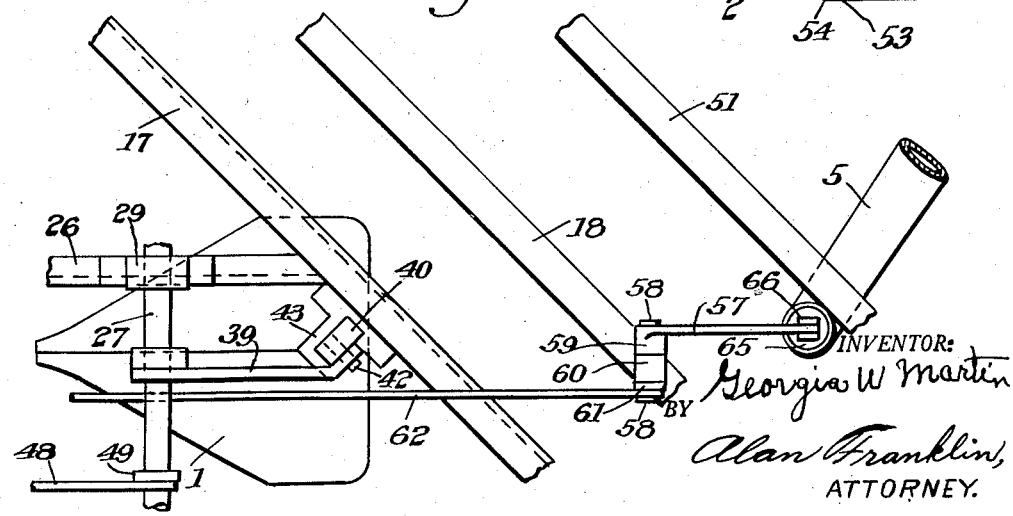
INVENTOR:
Georgia W. Martin
BY Alan Franklin,
ATTORNEY.

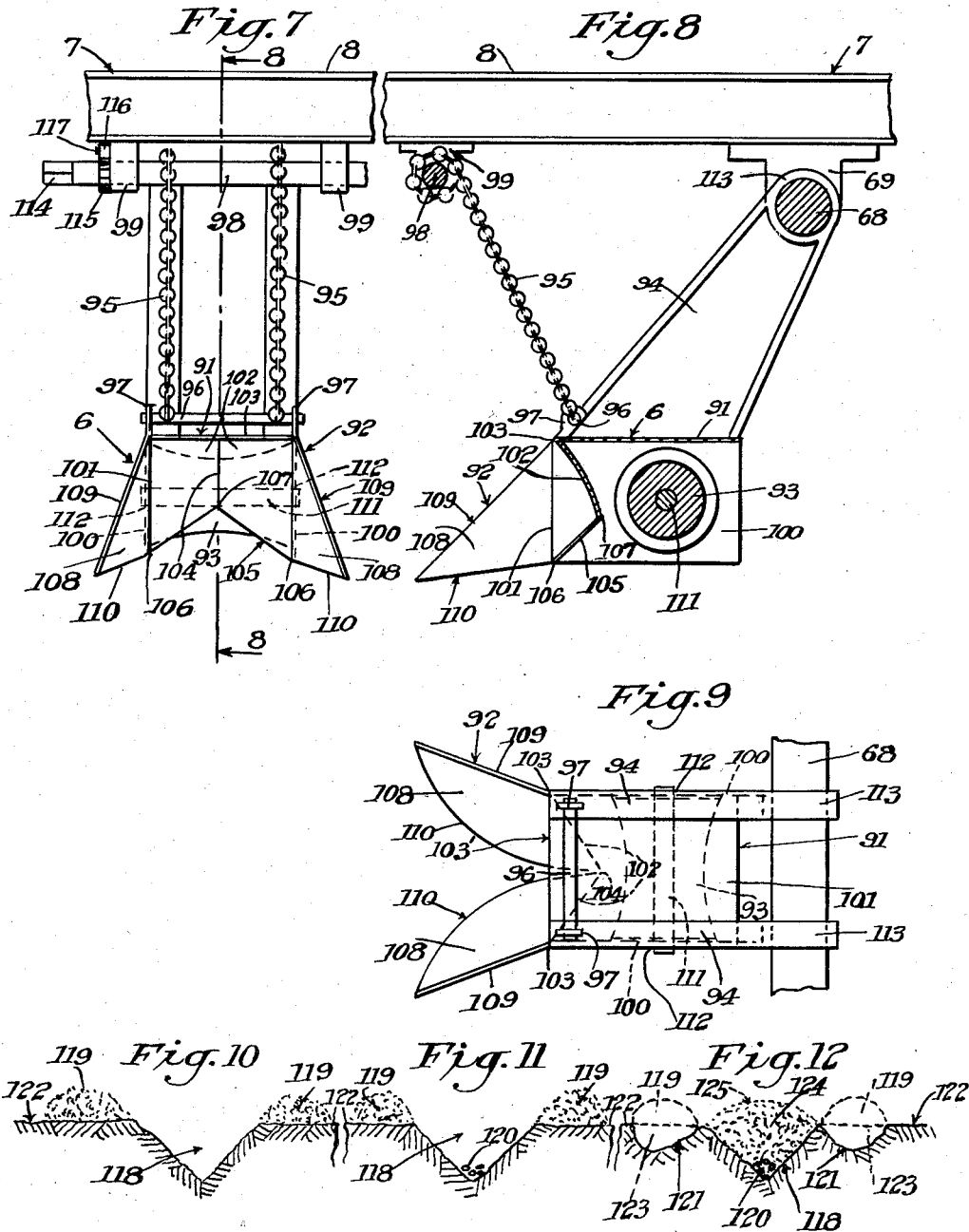

United States Patent Office 2,872,248
Patented Feb. 3, 1959

2,872,248

PNEUMATIC CONVEYOR FOR PLANTING IMPLEMENT

Georgia W. Martin, Los Angeles, Calif.

Application June 25, 1953, Serial No. 364,030

1 Claim. (Cl. 302—21)

This invention relates to agricultural implements, and more particularly to a planting implement, for planting wheat, rye, corn, barley and other seeds, and the general object of the invention is to provide a planting implement of the character stated for plowing furrows in the soil, depositing seed in said furrows, and for shaping said furrows, by filling up said furrows above the tops thereof over said seed deposited therein, with the loose soil plowed from said furrows, and by plowing shallow drain trenches at opposite sides of said furrows, and rolling the loose soil over the tops of the furrows into convex rows of planted seed, as the implement is drawn over the land by a tractor or otherwise.

A more particular object of the invention is to provide vacuum means for drawing the seeds from a receptacle on the planting implement and forcing said seeds down through planting tubes into the furrows, respectively, which are plowed by the planting implement.

Other objects and advantages will appear hereinafter as this specification progresses.

In the drawing:

Fig. 1 is a plan view of my invention.

Fig. 2 is a side elevation, partly in longitudinal section of my invention as shown in Fig. 1.

Fig. 3 is a front end elevation of my invention, as shown in Figs. 1 and 2.

Fig. 4 is a fragmentary side elevation, on an enlarged scale, of a portion of my invention, as illustrated in Fig. 6, showing one of the rear furrow plows and a portion of one of the rear seed depositing devices, shown in section.

Fig. 5 is a fragmentary horizontal section of one of the seeding devices taken on line 5—5 of Fig. 4.

Fig. 6 is a fragmentary plan view of my invention, on an enlarged scale, as partly illustrated in Fig. 4.

Fig. 7 is a front elevation on an enlarged scale of one of the furrow filling and shaping devices.

Fig. 8 is a side elevation of Fig. 7.

Fig. 9 is a plan view of Figs. 7 and 8.

Fig. 10 is a cross section of one of the furrows plowed by my invention.

Fig. 11 is a cross section of one of the furrows as shown in Fig. 10, showing seed deposited by my invention in said furrow for planting said seed.

Fig. 12 is a cross section of one of said furrows with seed deposited therein as shown in Fig. 11, and showing also drain trenches plowed at both sides respectively of said furrow, and the soil plowed from said furrow and drain trenches filling, closing and shaping said furrow with the seed planted in said furrow, by my invention.

Referring more particularly to the drawings in which the same parts are designated by the same reference numerals in all of the views, my invention includes a plurality of small plows 1 for plowing furrows in land, a plurality of seed-dropping tubes 2, a seed receptacle 3, in the bottom of which is mounted a suction and blower fan 4, a plurality of fan-blower outlet delivery tubes 5 leading forwardly and radially from said fan 4 and downwardly to the upper end portions of said seed-dropping tubes 2, respectively, for delivering seed from said seed receptacle 3 into said seed-dropping tubes 2, respectively, and a plurality of furrow-closing and shaping devices 6, for closing and shaping the furrows plowed by said small plows 1, respectively, after seed has been dropped through said seed-dropping tubes 2 into said furrows, respectively.

The elements 1 to 6, inclusive, are supported on a truck 7 including a horizontal frame 8, which is mounted near its rear end on a pair of wheels 9, whereby the implement is mounted to travel over land for performing its intended functions in the manner hereinafter more fully described. The frame 8 is formed with a pair of spaced longitudinal side beams 10; a transverse rear end beam 11 connected at its ends to the rear ends of said side beams 10; a pair of forward end angle beams 12 connected at their rear ends to the forward ends of the side beams 10, at 13, respectively, and converging forwardly to a vertical bearing 14 on the longitudinal axis of the implement; a pair of angle beams 15 and 16 extending parallel to one of the forward end angle beams 12, and connected at their rear ends to the inner side of one of the side beams 10; a pair of angle beams 17 and 18 extending parallel to the other forward end beam 12, and connected at their rear ends to the inner side of the other side beam 10 and connected at their forward ends to the angle beams 15 and 16, respectively, and said angle beams 15 and 16 being connected at their forward ends respectively, to one of the forward end angle beams 12 and to the forward end portion of the angle beam 17; and a pair of bracket arms 19 extending forwardly from the rear ends of the forward end angle beams 12 at 13, in alignment with the side beams 10, respectively. A rock shaft 20 extends transversely of the forward end of the frame 8 and is journaled at its ends in the upper ends of a pair of arms 21 upstanding from the forward ends of the forward end brackets 19, respectively. A rock shaft 22 extends transversely of the forward end portion of the frame 8, and is journaled at its ends in the upper ends of a pair of arms 23 upstanding from the brackets 19, respectively, a short distance rearwardly of the rock shaft 20. A rock shaft 24 extends transversely of the forward portion of the frame 8, rearwardly of the rock shaft 22, and is journaled at its ends in a pair of arms 25, respectively, upstanding from the forward angle bars 12, respectively, of said frame 8. A pair of beams 26 extend longitudinally of the frame 8, inwardly from the side beams 10, respectively, of said frame, and are secured at their forward ends to the forward angle bars 12, respectively, and at their rear ends to the angle beams 15 and 17, respectively. A pair of short rock shafts 27 extend transversely of the frame 8, respectively, at the sides thereof and are journaled at their outer ends in arms 28, upstanding from the side members 10, respectively, of said frame, and at their inner ends in arms 29, respectively, upstanding from said beams 26.

A lever arm 30 is secured at its lower end on the rock shaft 20, which arm extends upwardly from said rod and is connected at its upper end, at 31, to the rear end of a link 32, which extends forwardly beyond the front end of the frame 8 and is connected at its forward end at 33 to an operating lever 34 connected at its lower end, at 35, in a ratchet frame 36 supported on a base plate 37, from the rear end of which plate extends a king bolt 38 upwardly through the vertical bearing 14 on the forward end of the truck frame 8, whereby the forward end of said frame is pivotally connected to said base plate 37 for the purpose hereinafter more fully described. On the rock shaft 20 is secured the upper end of a plow connecting lever 39 which extends downwardly rearwardly to the upper end of the vertical shank 40 of the foremost central plow 1 below the center of the frame 8, in which lower rear end of said lever 39 is provided a short longitudinal slot 41 through which extends a pin 42 on the upper end of said plow shank 40. On the forward side of the angle beam 17 near the central longitudinal axis of the frame 8 is secured a vertical slide bearing 43, through which slides the upper end portion of the vertical shank 40 of said foremost plow 1. Two plows 1 are slidably mounted on the angle beam 15, rearwardly of and at the right of said foremost central plow 1, and two plows 1 are slidably mounted on the angle beam 17, rearwardly of and at the left of said foremost plow 1, in the same manner that said foremost central plow 1 is mounted on said angle beam 17 as above described, that is to say that the two plows 1 at the right of said foremost central plow 1 are slidably mounted by means of their vertical shanks 40 in slide bearings 43 secured on the angle beam 15, and that the two plows 1 at the left of said foremost central plow 1 are slidably mounted by means of their vertical shanks 40 in slide bearings 43 secured on the angle beam 17, and the upper ends of said shanks of said plows, at the right and at the left of said foremost plow, are connected to the lower rear ends of additional arms 32, respectively, by pins 42 on the upper ends of said right and left plow shanks, extending through slots 41 in said ends of said arms 39, respectively, the forward ends of the said two right and left arms 39 nearer the foremost plow 1 being secured on the rock shaft 24, and the forward ends of the said two remaining right and left arms 39 further outwardly from said foremost central plow 1 being secured on the rock shafts 27, respectively. A short upstanding arm 44 is secured at its lower end on the rock shaft 20, and at its upper end to the forward end of a link 45 which is connected at its rear end to the upper end of a short upstanding arm 46 secured at its lower end of the rock shaft 24, whereby said rock shaft 24 is rocked by the rocking movement of said rock shaft 20. On the ends, respectively, of the rock shaft 24, are secured the lower ends of a pair of arms 47, the upper end of which arms are connected to the forward ends of a pair of links 48, respectively, the rear ends of which links are connected to the upper ends of a pair of short arms 49, respectively, secured at their lower ends on the shafts 27, respectively, whereby rocking movement of the shaft 24 causes a like movement of the shafts 27, respectively.

Each of the seed-dropping tubes 2 is slidably mounted in a vertical tubular bearing 50, which is secured at its upper end in the truck frame 8 to an angle beam 51 or 52, substantially parallel to and rearwardly of the angle beams 18 and 16, respectively, the beam 51 being secured at its forward end to the beam 16 and at its rear end to the inner side of the left side beam 10 of said truck frame 8, and the beam 52 being secured at its forward end to the beam 51 and at its rear end to the inner side of the right side beam 10 of said frame 8. The delivery tubes 5 from the suction blower fan 4 are connected at their lower ends to the sides of the tubular bearings 50, respectively, near the upper ends of said bearing and lead into said bearings as indicated at 53, while the seed-dropping tubes are provided with a port 54 which register with the lower ends of said delivery tubes 5, respectively, when said seed-dropping tubes 2 are lowered to their lowermost positions, as shown in Fig. 4 of the drawing. Each of the seed-dropping tubes 2 is closed at its upper end by an end wall 55 and is pivotally connected at said end, at 56, to the rear end of a lever arm 57, which is connected at its forward end to a rock shaft 58 journaled in a bearing 59 on the upper end of a standard 60 secured on and upstanding from an angle beam 16 or 18. A shaft 58 is journaled in one of said bearings 59, on the upper end of a standard 60 which is secured on the angle beam 16, on the central longitudinal axis of the truck 7, on which shaft 58 the forward end of the lever arm 57 is secured, which arm is pivoted at its rear end to the upper end of the seed-dropping tube 2, which is also located on said central longitudinal axis of said truck, to which tube leads the fan-blower outlet tube 5 which extends forwardly likewise on said central longitudinal axis of said truck 7. Two shafts 58 are journaled in two of said bearings 59, respectively, on the upper ends of two standards 60, which standards are spaced progressively to the right of the central longitudinal axis of the truck 7, and are secured on the angle beam 16, on which two shafts 58 are secured the forward ends of two lever arms 57, respectively, the rear ends of which arms are connected to the upper ends of two seed-dropping tubes 2, respectively, which are also spaced progressively to the right of the central longitudinal axis of the truck 7, into the upper ends of which seed-dropping tubes 2 lead the lower ends of two fan-blower outlet delivery tubes 5, which are likewise spaced progressively to the right of said central longitudinal axis of the truck 7. Two shafts 58 are journaled in two of said bearings 59, respectively, on the upper ends of two standards 60, which standards are spaced progressively to the left of the central longitudinal axis of the truck 7 and are secured on the angle beam 18, on which two shafts 58 are secured the forward ends of two lever arms 57, respectively, the rear ends of which lever arms are connected to the upper ends of the two seed-dropping tubes 2, respectively, which tubes are also spaced progressively to the left of the central longitudinal axis of the truck 7, into the upper ends of which seed-dropping tubes 2 lead the lower ends of two blower-outlet delivery tubes 5, which are likewise spaced progressively to the left of said central longitudinal axis of the truck 7. To the shafts 58 are secured the lower ends of four vertical arms 61 upstanding from said shafts 58 and connected at their upper ends to the rear ends of four elongated links 62, the forward ends of which links are connected to the upper ends of four vertical lever arms 63 upstanding from the rock shaft 22 on which the lower ends of which lever arms are secured. A link 64 is connected at its rear end also to the upper end of said lever arm 63, and at its forward end to an operating lever 65 which is pivotally connected at its lower end, at 35, in the ratchet frame 36 supported on the forward end of the base plate 37 on the rear end of which plate is mounted the king bolt 38, and said base plate rests upon and is detachably secured to a rear platform 66 mounted on and projecting rearwardly from a tractor 67, shown in dotted lines in Figs. 1 and 2 of the drawings.

The truck 7 is mounted at its rear end on a pair of wheels 9 by means of an axle 68 journaled in bearings 69 secured to the underside of the truck frame 28 at opposite sides of said frame, on the ends, respectively, of which axle said wheels 9 are secured.

The suction and blower fan 4 comprises a fan housing 70 in which is mounted a rotary fan 71, into one side of which housing leads an inverted inlet funnel 72, and from the upper forward side of which housing leads the outlet delivery tubes 5 downwardly to the upper ends of the seed-dropping tubes 2, respectively. The inlet funnel 72 is formed at its rear reduced end with a downwardly extending restricted entrance 73 which communicates with the upper restricted end 74 of an inverted hopper 75 located centrally of the receptacle 3 near the lower wall 76 of said receptacle. The lower portion of the receptacle 3 is formed with an inverted frusto conical wall 77 which converges downwardly to the bottom wall 76 of the receptacle, within a short distance outwardly from the lower edge of the blower hopper 75, leaving a very narrow annular entrance space 78 to the narrow space 79 between the lower end of said hopper 75 and said bottom wall 76 of the receptacle 3, as shown in Fig. 2 of the drawings. The rotary fan 71 is secured in the lower part of the housing 70 on the inner end of a shaft 80, which extends diametrically of the seed receptacle 3, through the rear of the lower inverted conical wall portion 77 of said receptacle, through the rear wall of the restricted entrance 73 of funnel inlet 72 and through said inlet to said fan 71, said shaft 80 being journaled near its inner end in a bearing 81 in said rear wall of said restricted inlet entrance 73, and at its outer end in a bearing 82 on the outer side of the rear of said lower inverted conical wall 77 of said receptacle 3. On the outer end of the fan shaft 80 is secured a miter pinion 83 in mesh with another miter pinion 84 secured on the inner end of a transverse shaft 85 extending transversely of the truck 7 from said miter pinion 84 to the right of said truck outside of the right beam 10 of the truck frame 8, said transverse shaft 85 being journaled near its inner end in a bearing 86 depending from the lower side of the lower inverted conical wall 77 of the seed receptacle 3, and journaled in a bearing 87 upstanding from the right side beam 10 of the truck frame 8. On the outer right end of the transverse shaft 85 outside of said right side beam 10, is secured a small sprocket 88, over which sprocket and a larger sprocket 89 secured on the truck axle 67 outside of said right truck beam 10, extends a chain 90.

Each of the furrow-closing and shaping devices 6 includes a box-shaped housing 91, a dual auxiliary furrow closing and shaping plow 92, a longitudinally concaved shaping roller 93 mounted in said housing 91, a pair of hangers 94 for pivotally hanging said housing 91, plow 92 and shaping roller 93 on the truck wheel axle 68, a pair of chains 95 connected at their lower ends to a rod 96 extending transversely over the housing 91 and secured at its ends in brackets 97 secured to the forward lower end portions of said hangers 94, respectively, and said chains are secured at their upper ends to, and wound around a winding shaft 98, extending transversely of and under the truck frame 8 and journaled in bearings 99 depending from the lower side of said truck frame 8, as shown in Figs. 7 and 8 of the drawings.

The housing 91 is formed with a pair of side walls 100 an upper wall 101, and a front wall 102, concaved downwardly and rearwardly from the forward end of the upper wall of said housing 91, which front wall is formed V-shape, extending rearwardly from the front upper corners 103 of said side walls 100 and the front edge 103' of the upper wall 101, to a vertical crotch 104 on the longitudinal central axis of the furrow-closing and shaping device 6, and the lower edge 105 of said front wall 102 is formed V-shape, extending from the lower front corners 106 of said side walls 100 upwardly to a point 107, on said longitudinal central axis of the device 6, the lower side and the rear end of said box-shaped housing 91 being left open. The furrow-closing and shaping auxiliary dual plow 92 comprises a pair of plow blades 108, the upper and lower edges 109 and 110 of which extend forwardly, downwardly and outwardly at an inclination with their said lower edges 110 being curved convexly and downwardly (Fig. 9). The shaping roller 93 is located within said housing 91 and is secured on a shaft 111 which is journaled at its ends by means of bearings 112 in said side walls 100 of said housing. The upper ends of the hangers 94 are formed with bearings 113 through which the wheel axle 68 turnably extends and on which axle said hangers 94 are hung to be swung up or down for raising or lowering the housing 91, auxiliary plow 92 and shaping roller 93. The chain-winding shaft 98 is formed with a square end 114 to receive a crank (not shown) for turning said shaft for winding the chains 95 thereon or for unwinding said chains from said shaft. A ratchet 115 is secured on the winding shaft 98 and is engaged by a pawl 116 pivoted by a pivot 117 to one side of one of said shaft bearings 99 for holding said winding shaft 98 against turning and allowing the chains 95 to unwind from said shaft, and lower the forward end of the devices 6.

The operation of my invention is as follows:

My implement being connected at its forward end, by the king bolt 38, to the rear end platform 66 of the tractor 67 and the implement being located in a suitable position on farm land, a crank is applied to the square end 114 of the winding shaft 98, and the pawl 116, being disengaged from the ratchet 116, said crank is turned backward (Fig. 8) until a sufficient length of the chains 95 is unwound from the winding shaft 98 to lower the furrow closing and shaping devices 6 to a lower position, with their housings 91 and auxiliary dual plows 92 resting upon the ground, so that the blades 108 of each of said plows may plow shallow trenches at opposite sides, respectively, of the furrows 118 to be plowed by my implement, as the same is drawn forwardly over said farm land, in the manner about to be described.

The engine of the tractor 67 is then started, and the tractor is driven forwardly by the operator, which draws my implement forwardly over the farm land, whereupon the operator on the tractor first swings the plow-operating lever 34 forwardly to lower the plows 1 to the proper depth in the ground for plowing the furrows 118, and leaving the plowed earth in two rows 119 on the land above the furrows at the upper side edges, respectively, of said furrows, as shown in Fig. 10 of the drawing, and the operator then swings the operating lever 65 forwardly to lower the seed-dropping tubes 2 the proper depth into said plowed furrows 118 for dropping the seed 120 into said furrows 118, as shown in Fig. 11 of the drawing, while the furrow-closing and shaping devices 6 are drawn by my implement over the farm land, whereby the lower forward pointed end portions of the two blades 108 of the dual plows 92, plow shallow trenches 121 at the side edges of the furrows 118, while the rear portions of said plow blades 108 of said dual plows 92, respectively, extending above the surface 122 of the land, sweep the plowed rows of earth 119 and the earth 123 plowed from said trenches 121 inwardly into the furrows 118 over the seed 120 dropped into said furrows by the dropping tubes 2, respectively, until said furrows 118 are filled by said loose plowed earth 119 and 123, so that said filling of loose earth extends above the upper ends of the furrows 118 and above the surface 122 of the land, whereupon the concaved roller 93 rolls over the loose earth extending above the furrows 118 and the surface 122 of the earth and packs down said loose earth above the furrows into rows 124 or elongated mounds with their upper surfaces 125 convex in cross section, as shown in Fig. 12 of the drawings.

The plows 1 are lowered or raised, by swinging the operating lever 34 backwardly or forwardly, through the medium of the link 32, arm 30, rock shaft 20 on which shaft said arm 30 is secured, arm 39 secured at its forward end on said rock shaft 20 and at its rear end to the upper end of the shank 40 of the foremost plow 1 on the central longitudinal axis of the truck 7; through link 45, connected at its forward end to an arm 44 secured on rock shaft 20, and connected at its rear end to an arm 46 secured on rock shaft 24, and arms 39 secured at their forward ends on rock shaft 24 and connected at their rear ends to the upper ends of the shanks 40 of the two plows 1 which are located nearest said plow 1 on the central longitudinal axis of the truck 7, at the right and left, respectively, of said first plow 1 on said central longitudinal axis; through links 48, connected at their forward ends to arms 47 secured on the ends, respectively of the rock shaft 24, and connected at their rear ends to arms 49 secured on the two rock shafts 27, respectively, and links 39 secured at their forward ends to the rock shafts 27, respectively, and connected at their rear ends to the upper ends of the shanks 40 of the plows 1 located farthest to the right and to the left, respectively, of said plow 1 on the central longitudinal axis of the truck 7.

The seed-dropping tubes 2 are lowered or raised by swinging the operating lever 65 rearwardly or forwardly, through the medium of the link 64, connected at its forward end to said lever at 63', and at its rear end to the upper end of an arm 63, secured at its lower end on the rock shaft 22, a link 62 connected at its forward end to the rear end of said link 64 and to the upper end of said arm 63, and connected at its rear end to the upper end of an arm 61, secured at its lower end on a rock shaft 58, journaled in the bearing 59 on the standard 60 upstanding from the angle beam 18 of the truck frame 8, and an arm 57, secured at its forward end on said rock shaft 58, and connected at its rear end to the upper end of the foremost seed-dropping tube 2 located on the central longitudinal axis of said truck frame 8; through the medium of said rock shaft 22, two arms 63 secured on said rock shaft in spaced relation at the right of said central longitudinal axis of the truck frame 8, and two arms 63 secured on said rock shaft 22 in spaced relation at the left of said central longitudinal axis, two links 62 connected at their forward ends to said arms 63 at the right of said central longitudinal axis of said frame 8 and two links 62 connected at their forward ends to said arms 63 at the left of said central longitudinal axis, two arms 61 secured on a rock shaft 58 journaled in bearings 59 on the upper ends of standards 60 secured on the angle frame member 16, to the upper ends of which latter arms 61 are connected the rear ends of said links 62, respectively, at the right of said central longitudinal axis, and two arms 61 secured on rock shafts 58 in bearings 59 on the upper ends of standards 60 secured on the angle frame member 18, to the upper ends of which latter arms 61 are connected the rear ends of said links 62, respectively, at the left of said central longitudinal axis of the truck frame 8, two arms 57 secured at their forward ends on said rock shaft 58 journaled in bearings 59 on said standards 60 secured on said angle frame members 16, the rear ends of which arms 57 are connected to the upper ends of the two seed-dropping tubes 2 located in spaced relation progressively at the right and rearwardly of said seed-dropping tube 2 on the central longitudinal axis of the truck frame 8, and two arms 57 secured at their forward ends on said rock shaft 58 journaled in bearings 59 on standards 60 secured on the angle frame member 18, the rear ends of which arms 57 are connected to the upper ends of the two seed-dropping tubes 2 located in spaced relation progressively at the left and at the rear of said seed-dropping tube 2 on said central longitudinal axis of the truck frame 8. When the seed-dropping tubes 2 are lowered, as aforesaid, by swinging the operating lever 65 rearwardly, the openings 54 in said seed-dropping tubes 2 are lowered into registration with the lower ends of the outlet delivery tubes 5 of the suction and blower fan 4, whereby seeds 120 are drawn from the seed receptacle 3 by the fan 71 into the housing 70 and are delivered by said fan from said housing through the blower outlet tubes 5 into the upper ends of the seed-dropping tubes 2, respectively, through which latter tubes 2 said seed are dropped into the furrows 118, as illustrated in Figs. 4 and 11 of drawings.

I claim:

An implement as disclosed including a seed receptacle formed with an upper cylindrical wall, a lower inverted frusto-conical wall, and a bottom wall, said lower inverted frusto-conical wall converging downwardly from the lower end of said cylindrical wall to said bottom wall, and a suction and blower fan formed with an inlet and a conical hopper mounted in the lower end of said seed receptacle, and leading into the inlet of said suction and blower fan, the mouth of said hopper being of such area as to provide a narrow annular space between the lower annular edge wall of said conical hopper and the lower end portion of said frusto-conical wall of said seed receptacle, through which annular space the seeds are drawn by the suction and blower fan from said seed receptacle into said conical hopper, through the fan inlet and through the fan, for discharging seed therefrom and from said seed receptacle, through a seed-dropping tube into a furrow below said dropping tube.

References Cited in the file of this patent

UNITED STATES PATENTS

| Number | Name | Date |
|---|---|---|
| 36,291 | Gage | Aug. 26, 1862 |
| 66,600 | Lewis | July 9, 1867 |
| 144,918 | Moore | Nov. 25, 1873 |
| 186,800 | Clarridge | Jan. 30, 1877 |
| 203,529 | Woodward et al. | May 14, 1878 |
| 263,248 | Thompson | Aug. 22, 1882 |
| 441,810 | Strawson | Dec. 2, 1890 |
| 534,403 | Mechwart | Feb. 19, 1895 |
| 1,173,073 | Williams | Feb. 22, 1916 |
| 1,282,697 | Johnson | Oct. 22, 1918 |
| 1,407,795 | McBride | Feb. 28, 1922 |
| 1,446,605 | White | Feb. 27, 1923 |
| 1,810,671 | Matheson | June 16, 1931 |
| 1,897,421 | Dempster et al. | Feb. 14, 1933 |
| 2,031,713 | Johnson | Feb. 25, 1936 |
| 2,120,003 | Schanz | June 7, 1938 |
| 2,633,390 | Bush | Mar. 31, 1953 |
| 2,729,157 | Webb | Jan. 3, 1956 |